United States Patent
Mitsui et al.

(10) Patent No.: US 10,893,567 B2
(45) Date of Patent: Jan. 12, 2021

(54) COMMUNICATION METHOD, RADIO TERMINAL, PROCESSOR, AND BASE STATION

(71) Applicant: KYOCERA CORPORATION, Kyoto (JP)

(72) Inventors: Katsuhiro Mitsui, Ritto (JP); Hiroyuki Adachi, Kawasaki (JP); Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/052,926

(22) Filed: Aug. 2, 2018

(65) Prior Publication Data

US 2018/0343698 A1    Nov. 29, 2018

Related U.S. Application Data

(63) Continuation of application No. PCT/JP2017/003702, filed on Feb. 2, 2017.

(60) Provisional application No. 62/291,128, filed on Feb. 4, 2016.

(51) Int. Cl.
| | |
|---|---|
| *H04W 76/20* | (2018.01) |
| *H04W 76/11* | (2018.01) |
| *H04W 76/15* | (2018.01) |
| *H04W 76/19* | (2018.01) |
| *H04W 92/12* | (2009.01) |
| *H04W 92/20* | (2009.01) |
| *H04W 48/20* | (2009.01) |

(Continued)

(52) U.S. Cl.
CPC ............ *H04W 76/20* (2018.02); *H04W 76/11* (2018.02); *H04W 76/15* (2018.02); *H04W 76/19* (2018.02); *H04W 48/20* (2013.01); *H04W 88/06* (2013.01); *H04W 88/08* (2013.01); *H04W 92/12* (2013.01); *H04W 92/20* (2013.01)

(58) Field of Classification Search
CPC ......................... H04W 76/27; H04W 36/0033
See application file for complete search history.

(56) References Cited

U.S. PATENT DOCUMENTS

2006/0039316 A1* 2/2006 Ogushi ................... H04W 8/26
                                                                370/328
2014/0321371 A1* 10/2014 Anderson ............. H04W 76/38
                                                                370/329

(Continued)

FOREIGN PATENT DOCUMENTS

EP          2 645 804 A1    10/2013

OTHER PUBLICATIONS

NTT Docomo, Inc.; Work on user plane based solution with AS information stored in RAN; 3GPP TSG-RAN WG2 #92, R2-156424; Nov. 16-20, 2015; 12 pages; Anaheim, U.S.A. (Year: 2015).*

(Continued)

*Primary Examiner* — Romani Ohri

(74) *Attorney, Agent, or Firm* — Studebaker & Brackett PC

(57) ABSTRACT

In a communication method according to an embodiment, in a procedure where a connection between a radio terminal and a network is temporarily suspended, a resumption identifier associated with context information of the radio terminal is transmitted from a first base station to the radio terminal. A part of the resumption identifier is information for identifying the first base station.

6 Claims, 10 Drawing Sheets

(51) Int. Cl.
*H04W 88/06* (2009.01)
*H04W 88/08* (2009.01)

(56) References Cited

U.S. PATENT DOCUMENTS

| | | | | |
|---|---|---|---|---|
| 2015/0058649 | A1* | 2/2015 | Song | G06F 1/3231 713/323 |
| 2015/0373608 | A1* | 12/2015 | Zhu | H04W 76/25 370/252 |
| 2016/0278160 | A1* | 9/2016 | Schliwa-Bertling | H04W 48/02 |
| 2017/0094711 | A1* | 3/2017 | Hu | H04W 74/0833 |
| 2019/0021134 | A1* | 1/2019 | Zhang | H04W 76/27 |

OTHER PUBLICATIONS

CATT; Open Issues of Solutions 18; 3GPP TSG-RAN WG2 #NB-IOT; R2-160460; Jan. 19-21, 2016; 4 pages; Budapest, Hungary. (Year: 2016).*

3rd Generation Partnership Project; Technical Specification Group Services and System Aspects; Architecture enhancements for Cellular Internet of Things; 3GPP TR 23.720 VI.2.0; Nov. 2015; pp. 1-96; Release 13; 3GPP Organizational Partners (Year: 2015).*

3rd Generation Partnership Project; Technical Specification Group Services and System Aspects; Architecture enhancements for Cellular Internet of Things; 3GPP TR 23.720 V1.2.0; Nov. 2015; pp. 1-96; Release 13; 3GPP Organizational Partners.

NTT Docomo, Inc.; Work on user plane based solution with AS information stored in RAN; 3GPP TSG-RAN WG2 # 92; R2-156424; Nov. 16-20, 2015; 12 pages; Anaheim, U.S.A.

CATT; Open Issues of Solutions 18; 3GPP TSG-RAN WG2 #NB-IOT; R2-160460; Jan. 19-21, 2016; 4 pages; Budapest, Hungary.

Ericsson; Resume ID; 3GPP TSG-RAN WG2 NB-IOT Ad-hoc Meeting; Tdoc R2-160474; Jan. 19-21, 2016; 3 pages; Budapest, Hungary.

3rd Generation Partnership Project; Technical Specification Group Radio Access Network; Radio Link Control (RLC) protocol specification; 3GPP TS 25.322 V13.0.0; Dec. 2015; pp. 1-90; Release 13; 3GPP Organizational Partners.

ZTE; Open issues for cIoT optimization; 3GPP TSG-RAN WG2 Meeting #94; R2-164320; May 23-27, 2016; 5 pages; Nanjing, China.

BlackBerry UK Limited; "Re-use of RRC connection re-establishment procedure for RRC Resume signalling"; 3GPP TSG-RAN2 WG2 NB-IOT Ad-hoc Meeting; R2-160515; Jan. 19-21, 2016; total 6 pages; Budapest, Hungary.

ASUSTek, "Consideration on resume failure of UP solution", 3GPP TSG-RAN WG2 NB-IOT, R2-160438, Budapest, Hungary, Jan. 19-21, 2016, pp. 2-7.

Alcatel—Lucent, Nokia Networks; Commenting contribution on Ericsson's S3-160157 "Security for RRC Connection Suspend and Resume procedure in solution 18 for Narrow Band CIoT"; 3GPP TSG-SA WG3 Meeting #82, S3-160225; NB-IoT/ Release 13; Feb. 1-5, 2016; total 9 pages; Dubrovnik, Croatia.

Ericsson; RRC Connection Suspend and Resume; 3GPP TSG-RAN WG2 NB-IoT Ad-hoc Meeting; Tdoc R2-160475; Jan. 19-21, 2016; total 14 pages; Budapest, Hungary.

* cited by examiner

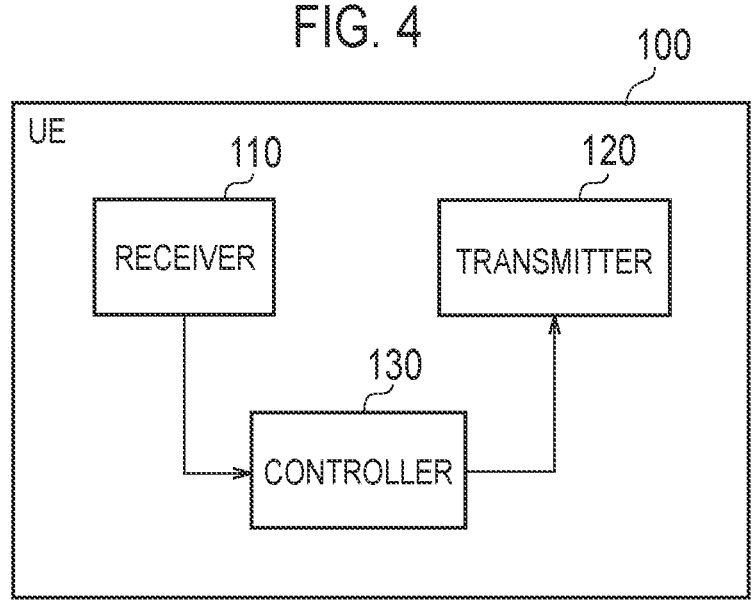
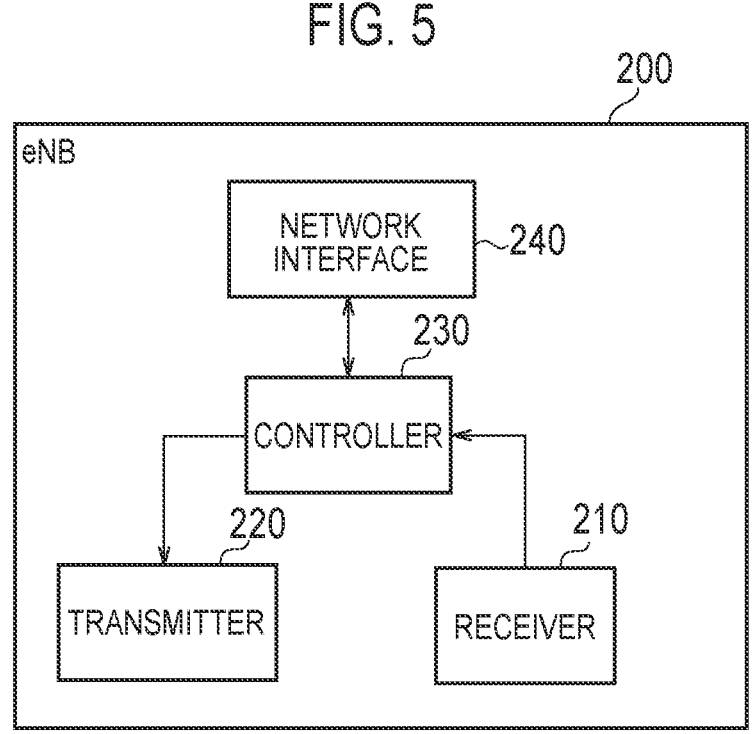

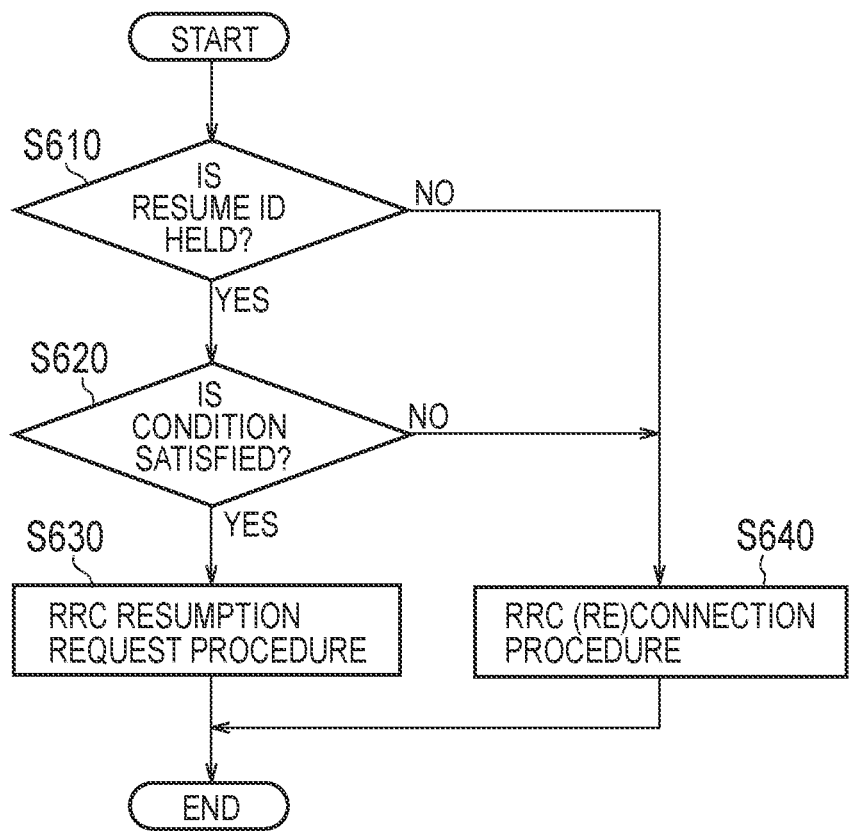

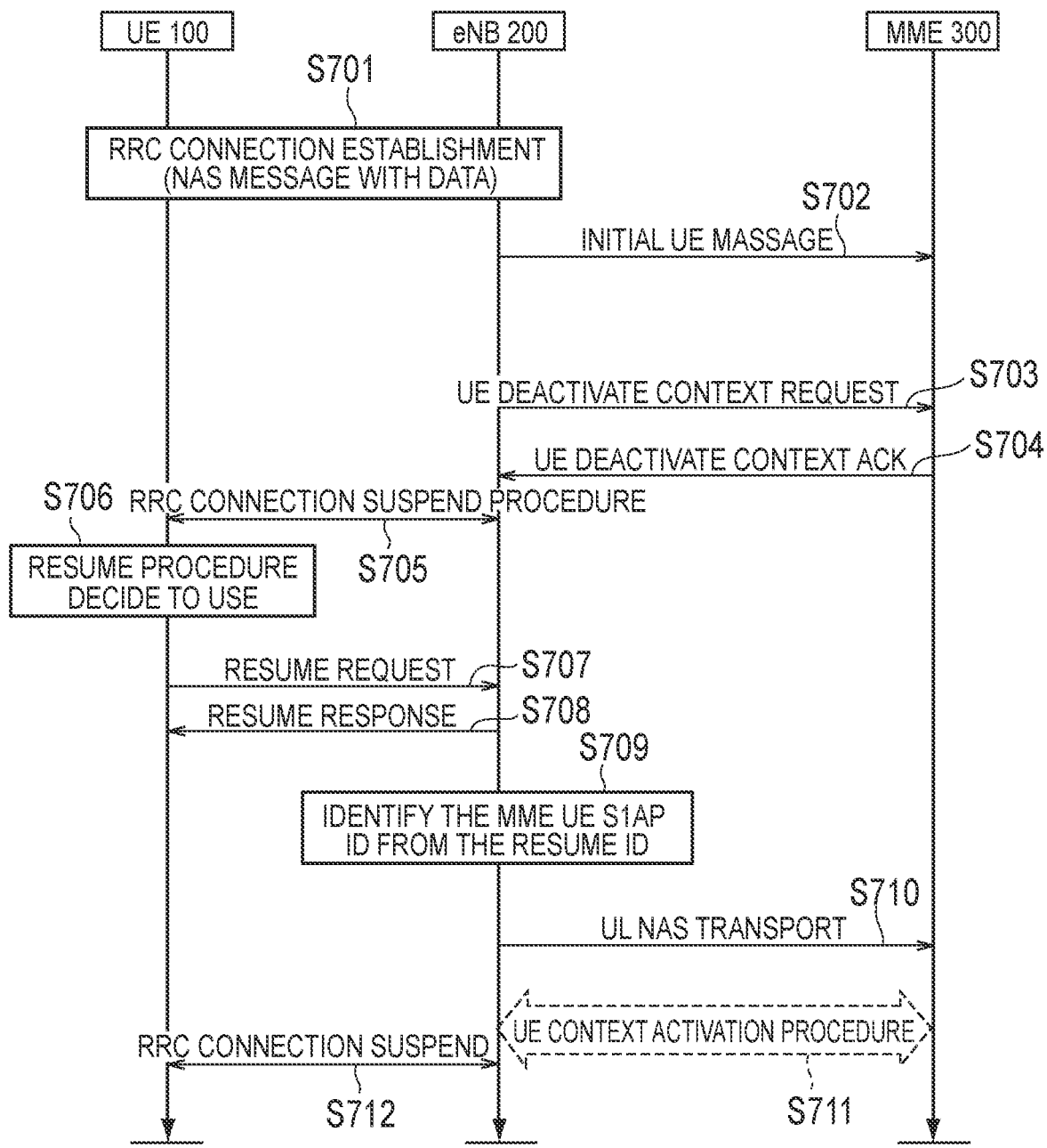

COMMUNICATION METHOD, RADIO TERMINAL, PROCESSOR, AND BASE STATION

CROSS-REFERENCE TO RELATED APPLICATION

The present application is a continuation based on PCT Application No. PCT/JP2017/003702 filed on Feb. 2, 2017, which claims the benefit of U.S. Provisional Application No. 62/291128 (filed on Feb. 4, 2016). The content of which is incorporated by reference herein in their entirety.

FIELD

The present disclosure relates to a communication method, a radio terminal, a processor, and a base station used in a communication system.

BACKGROUND

In 3GPP (3rd Generation Partnership Project) which is a project aiming to standardize a mobile communication system, to respond to a request for the IoT (Internet of Things), a specification of NB-IoT (NarrowBand Internet of Things) or new narrow-band radio technology has been prepared.

For example, the introduction of a temporary suspension procedure (Suspend Connection procedure) for temporarily suspending a connection between a radio terminal and a network and a resumption procedure for resuming the connection (Resume Connection procedure) has been studied.

SUMMARY

In a communication method according to one embodiment, in a procedure where a connection between a radio terminal and a network is temporarily suspended, a resumption identifier associated with context information of the radio terminal is transmitted from a first base station to the radio terminal. A part of the resumption identifier is information for identifying the first base station.

A radio terminal according to one embodiment comprises a receiver. The receiver is configured to receive, in a procedure where a connection between the radio terminal and a network is temporarily suspended, a resumption identifier associated with context information of the radio terminal from a first base station. A part of the resumption identifier is information for identifying the first base station.

A processor according to one embodiment is configured to control a radio terminal. The processor executes, in a procedure where a connection between the radio terminal and a network is temporarily suspended, a process of receiving from a first base station a resumption identifier associated with context information of the radio terminal. A part of the resumption identifier is information for identifying the first base station.

A base station according to one embodiment comprises a transmitter. Tthe transmitter is configured to transmit, in a procedure where a connection between a radio terminal and a network is temporarily suspended, a resumption identifier associated with context information of the radio terminal, to the radio terminal. A part of the resumption identifier is information for identifying the base station.

A processor according to one embodiment is configured to control a base station. The processor executes a process of transmitting, in a procedure where a connection between a radio terminal and a network is temporarily suspended, a resumption identifier associated with context information of the radio terminal, to the radio terminal. A part of the resumption identifier is information for identifying the base station.

In a communication method according to one embodiment, a radio terminal executes a procedure where a connection between the radio terminal and a network is temporarily suspended. Information indicating whether or not the connection can be resumed is transmitted from a base station to the radio terminal. The radio terminal determines by the information whether or not the connection can be resumed.

BRIEF DESCRIPTION OF THE DRAWINGS

FIG. 4 is a block diagram of a UE 100.

FIG. 5 is a block diagram of an eNB 200.

FIG. 11 is a flowchart for describing a third modification according to the first embodiment.

FIG. 12 is a sequence chart for describing a second embodiment.

DESCRIPTION OF THE EMBODIMENT

Overview of Embodiments

Figure 1:
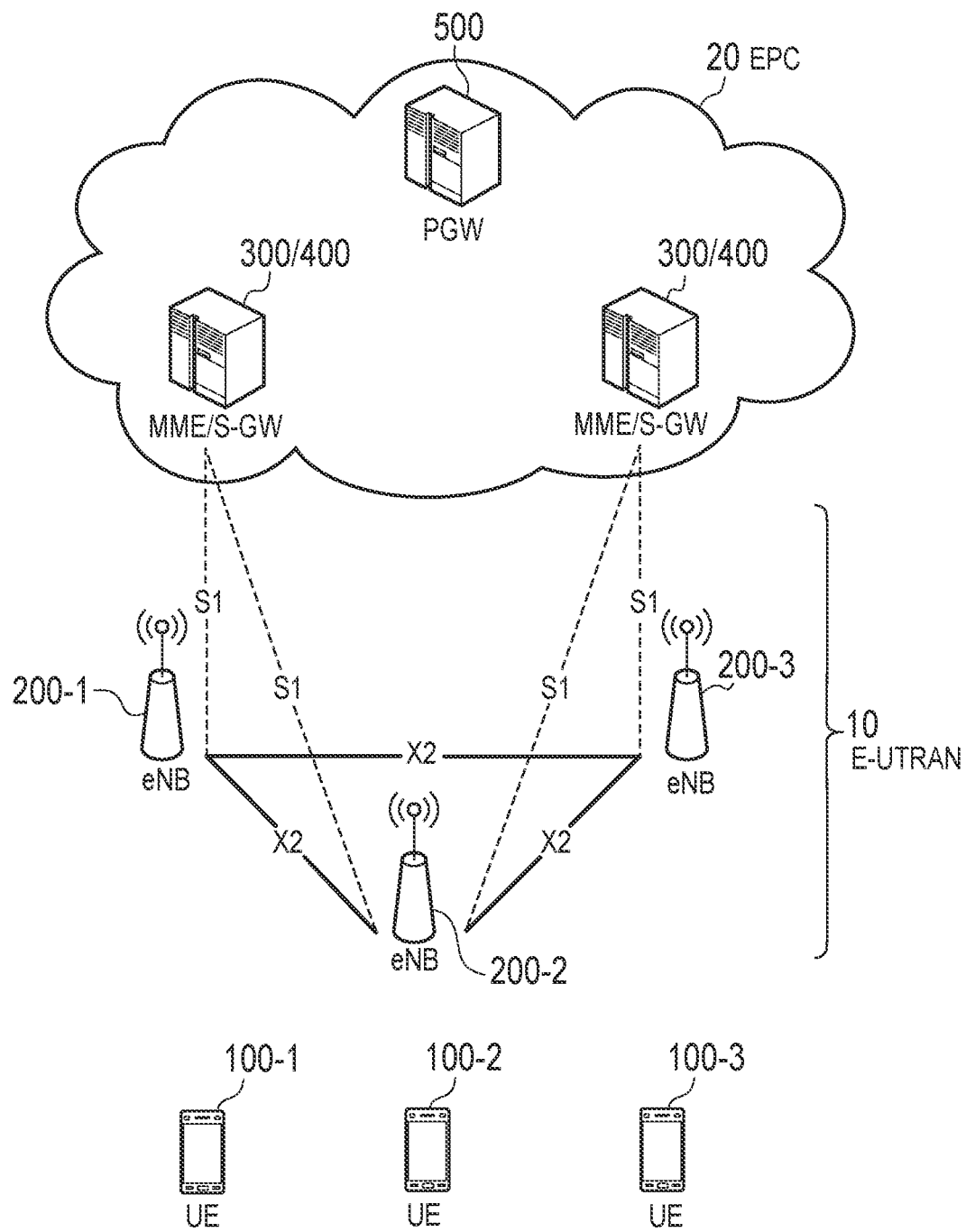
FIG. 1 is a diagram illustrating a configuration of an LTE system.

In a communication method according to one embodiment, in a procedure where a connection between a radio terminal and a network is temporarily suspended, a resumption identifier associated with context information of the radio terminal is transmitted from a first base station to the radio terminal. A part of the resumption identifier is information for identifying the first base station.

In the embodiment, if the radio terminal resumes the connection, a connection resumption request message may be transmitted from the radio terminal to a second base station different from the first base station. The connection resumption request message may include the resumption identifier.

A request message for transferring the context information of the radio terminal from the second base station to the first base station may be transmitted from the second base station to the first base station. The request message may include the resumption identifier.

In response to the first base station receiving the request message, the context information of the radio terminal may be transmitted from the first base station to the second base station.

After the second base station receives the context information of the radio terminal, from the second base station to Mobility Management Entity (MME), a request message for establishing a connection between the second base station and the MME may be transmitted.

The second base station may use the resumption identifier from the radio terminal to identify the first base station.

A second resumption identifier associated with the context information of the second radio terminal may be transmitted from a second radio terminal to the first base station. The second resumption identifier may be an identifier shorter than the resumption identifier.

A radio terminal according to one embodiment comprises a receiver. The receiver is configured to receive, in a procedure where a connection between the radio terminal and a network is temporarily suspended, a resumption identifier associated with context information of the radio terminal from a first base station. A part of the resumption identifier is information for identifying the first base station.

A processor according to one embodiment is configured to control a radio terminal. The processor executes, in a procedure where a connection between the radio terminal and a network is temporarily suspended, a process of receiving from a first base station a resumption identifier associated with context information of the radio terminal. A part of the resumption identifier is information for identifying the first base station.

A base station according to one embodiment comprises a transmitter. Tthe transmitter is configured to transmit, in a procedure where a connection between a radio terminal and a network is temporarily suspended, a resumption identifier associated with context information of the radio terminal, to the radio terminal. A part of the resumption identifier is information for identifying the base station.

A processor according to one embodiment is configured to control a base station. The processor executes a process of transmitting, in a procedure where a connection between a radio terminal and a network is temporarily suspended, a resumption identifier associated with context information of the radio terminal, to the radio terminal. A part of the resumption identifier is information for identifying the base station.

In a communication method according to one embodiment, a radio terminal executes a procedure where a connection between the radio terminal and a network is temporarily suspended. Information indicating whether or not the connection can be resumed is transmitted from a base station to the radio terminal. The radio terminal determines by the information whether or not the connection can be resumed.

If the temporary suspension procedure is executed, the base station having suspended the connection with the radio terminal holds context information of the radio terminal. When the resumption procedure is executed, the base station resumes the context information of the radio terminal. As a result, it is possible to reduce a signaling between the radio terminal and the base station as compared to a case where the connection is (re)established.

However, a case is now assumed where a radio terminal having transitioned to an ECM idle state by the temporary suspension procedure selects, as a result of movement, a cell managed by another base station. If the other base station does not holding the context information of the radio terminal, the resumption procedure will fail. The radio terminal may need to execute, after the resumption procedure is failed, a procedure for establishing the connection. As a result, the signaling may increase.

The radio terminal according to one embodiment includes, in a procedure where a connection between the radio terminal and a network is temporarily suspended, a receiver configured to receive a resumption identifier assigned to the radio terminal, and a transmitter configured to transmit the resumption identifier to the base station if requesting a resumption of the connection. At least a part of the resumption identifier is identification information for identifying a connection base station with which the radio terminal has been connected when the procedure is executed.

The identification information may be an identifier of a cell with which the radio terminal has been connected when the procedure is executed.

The transmitter may transmit to the base station, together with the resumption identifier, information necessary to establish an RRC connection between the radio terminal and the base station.

The transmitter may transmit the resumption identifier to the base station if a cell reselection count after the procedure is executed is less than a threshold value. The transmitter may omit the transmission of the resumption identifier, if the cell reselection count is equal to or more than the threshold value.

The transmitter may transmit the resumption identifier to the base station, if the radio terminal is located within a region capable of resuming the connection. The transmitter may omit the transmission of the resumption identifier, if the radio terminal is not located within the region.

The transmitter may transmit the resumption identifier to the base station, if the base station is included in a base station group configured to support a transfer of context information of the radio terminal. The transmitter may omit the transmission of the resumption identifier, if the base station is not included in the base station group.

The radio terminal according to one embodiment includes, in a procedure where a connection between the radio terminal and a network is temporarily suspended, a receiver configured to receive a resumption identifier assigned to the radio terminal, and a transmitter configured to transmit the resumption identifier to the base station if requesting a resumption of the connection. The transmitter transmits, to the base station, the identification information for identifying a connection base station with which the radio terminal has been connected when the procedure is executed.

The transmitter may transmit, together with the resumption identifier, the identification information to the base station.

The receiver may receive, after transmission of the resumption identifier, information indicating that the base station does not hold the context information, from the base station. The transmitter may transmit the identification information to the base station, in response to receipt of the information.

A base station according to one embodiment includes a receiver configured to receive a resumption identifier from a radio terminal; and a controller configured to transmit, after receiving the resumption identifier, predetermined information for receiving context information of the radio terminal to another base station. The resumption identifier is an identifier assigned to the radio terminal in a procedure where a connection between the radio terminal and a network is temporarily suspended. The context information is used to resume the connection. At least a part of the resumption identifier is identification information for identifying a connection base station with which the radio terminal has been connected when the procedure is executed. The controller transmits the predetermined information to the other base station, if the connection base station is not the base station but the other base station.

The receiver may receive from the radio terminal, together with the resumption identifier, information necessary to establish an RRC connection between the radio terminal and the base station. The controller may establish the RRC connection, based on the necessary information, if the context information cannot be received from the other base station.

A base station according to one embodiment includes a receiver configured to receive a resumption identifier from a radio terminal; and a controller configured to transmit predetermined information for receiving context information of the radio terminal to another base station. The resumption identifier is an identifier assigned to the radio terminal in a procedure where a connection between the radio terminal and a network is temporarily suspended. The context information is used to resume the connection. The receiver receives from the radio terminal identification information for identifying a connection base station with which the radio terminal has been connected when the procedure is executed. The controller transmits the predetermined information to the other base station, if the connection base station is not the base station but the other base station.

The base station may further include a transmitter configured to transmit, after receiving the resumption identifier, to the radio terminal information indicating that the context information is not held. The receiver may receive, after transmission of the information, the identification information from the radio terminal.

A base station according to one embodiment includes a receiver configured to receive from a radio terminal an NAS (Non-Access Stratum) message including uplink data and a resumption identifier; and a controller configured to execute a control to transmit a message including an identifier of the radio terminal within MME (Mobility Management Entity) and the uplink data, to the MME. The resumption identifier is an identifier assigned to the radio terminal in a procedure where a connection between the radio terminal and a network is temporarily suspended. The resumption identifier is associated with context information including the identifier of the radio terminal within the MME.

The radio terminal according to one embodiment includes a transmitter configured to transmit an NAS (Non-Access Stratum) message including uplink data, to the base station. If the radio terminal does not receive from the base station an NAS PDU (NAS Protocol Data Unit) including downlink data, the transmitter transmits, together with the NAS message, the resumption identifier to the base station. The resumption identifier is an identifier assigned to the radio terminal in a procedure where a connection between the radio terminal and a network is temporarily suspended. The resumption identifier is associated with context information including the identifier of the radio terminal within an MME (Mobility Management Entity).

First Embodiment (Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a radio terminal. The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400, and a PGW (Packet Data Network Gateway) 500.

The MME 300 performs, for example, various kinds of mobility control for the UE 100. The SGW 400 performs, for example, data transfer control. The MME 300 and the SGW 400 are connected to the eNB 200 via a S1 interface. The PGW 500 performs, for example, control of relaying user data from an external network (and to an external network).

Figure 2:
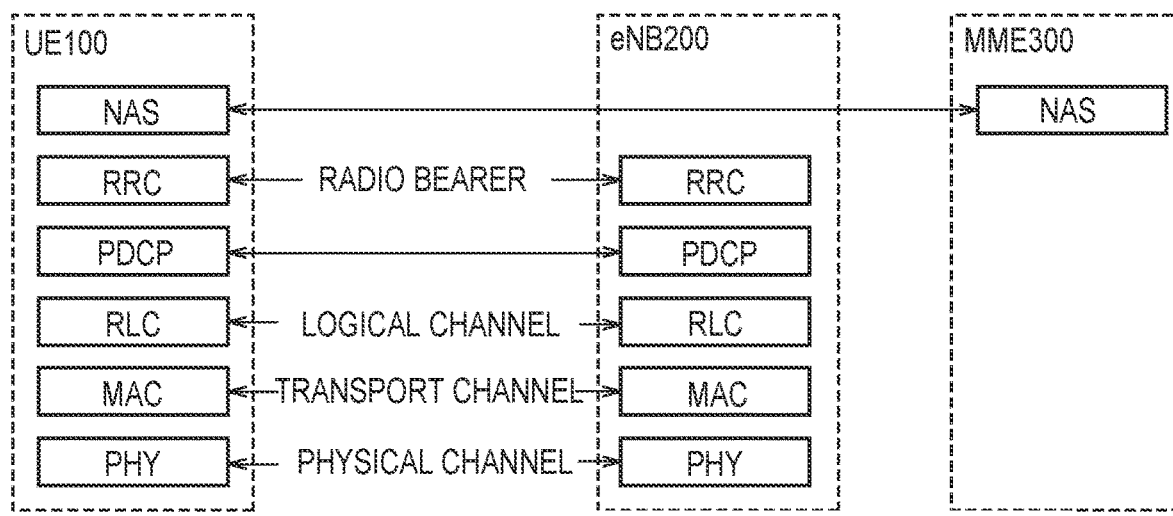
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
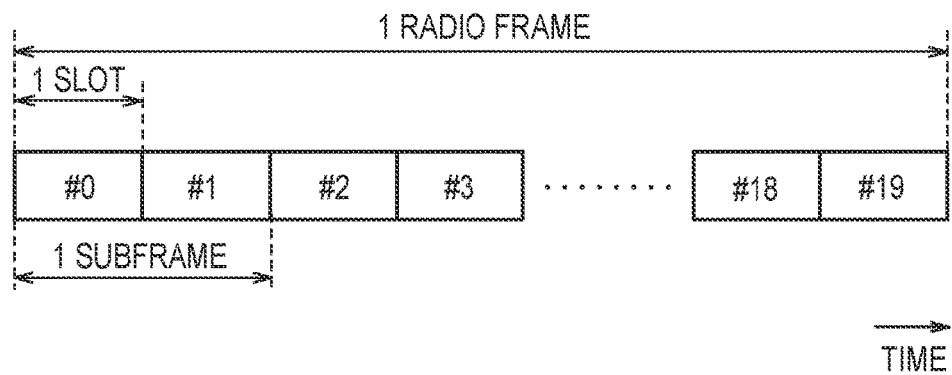
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Radio terminal) The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of reception under the control of the controller 130. The receiver 110 includes antennas. The receiver 110 converts a radio signal received by the antennas, into a baseband signal (reception signal). The receiver 110 outputs the baseband signal to the controller 130.

The transmitter 120 performs various types of transmission under the control of the controller 130. The transmitter 120 includes antennas. The transmitter 120 converts a baseband signal (transmission signal) output by the controller 130, into a radio signal. The transmitter 120 transmits the radio signal from the antenna.

The controller 130 performs various types of control in the UE 100. The controller 130 includes a processor and a memory. The memory stores a program to be executed by the processor, and information to be used in processing performed by the processor. The processor includes a baseband processor and a central processing unit (CPU). The baseband processor performs modulation/demodulation and encoding/decoding of a baseband signal, and the like. The CPU executes programs stored in the memory, to perform various types of processing. The processor may include a codec that performs encoding/decoding of an audio/video signal. The processor executes processes to be described later and the above-described various communication protocols.

The UE 100 may comprise a GNSS receiver. The GNSS receiver can receive a GNSS signal to obtain location information indicating geographical location of the UE 100. The GNSS receiver outputs the GNSS signal to the controller 130. The UE 100 may have a GPS function for acquiring the location information of the UE 100.

In the present specification, processing performed by at least one of the receiver 110, the transmitter 120, and the controller 130 of the UE 100 will be described as a process (operation) executed by the UE 100 for the sake of convenience.

(Base station)

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be an integrated transceiver.

The receiver 210 performs various types of reception under the control of the controller 230. Receiver 210 includes antennas. The receiver 210 converts a radio signal received by the antennas into a baseband signal (received signal). The receiver 210 outputs a baseband signal to the controller 230.

The transmitter 220 performs various transmissions under the control of the controller 230. The transmitter 220 includes antennas. The transmitter 220 converts the baseband signal (transmission signal) output from the controller 230 into a radio signal. The transmitter 220 transmits a radio signal from the antenna.

The controller 230 performs various controls in the eNB 200. The controller 230 includes a processor and a memory. The memory stores programs executed by the processor and information used for processing by the processor. The processor includes a baseband processor and a CPU. The baseband processor performs, for example, modulation/demodulation, encoding, decoding, etc. of the baseband signal. The CPU executes various processes by executing a program stored in the memory. The processor executes various processes to be described later and the above-described various communication protocols.

The network interface 240 is connected to neighbor eNB 200 via a X2 interface. The network interface 240 is connected to the MME 300 and the SGW 400 via the Si interface. For example, the network interface 240 is used for communication performed on the X2 interface and communication performed on the S1 interface.

In the present specification, processing performed by at least one of the transmitter 210, the receiver 220, the controller 230, and the network interface 240 of the eNB 200 will be described as a process (operation) executed by the eNB 200 for convenience.

(ECM state)

An ECM (EPS Connection Management) state will be described. The ECM state represents a signaling connectivity between the UE 100 and the EPC 20. The ECM state includes an ECM idle state (ECM-IDLE state) and an ECM connected state (ECM-CONNECTED state).

In the ECM idle state, there is no NAS signaling connection between the UE 100 and the network. The NAS signaling connection is configured by an Si MME connection and an S1 U connection. The S1 MME connection is a connection between the eNB 200 and the MME 300 in a C (Control) plane for transmitting a control signal. The S1 U connection is a connection between the eNB 200 and the SGW 400 in a U (User) plane for transmitting user data. The S1 MME connection and the S1 U connection configure an Si connection.

In the ECM idle state, there is no UE context (context other than a context for managing a mobility (for example, a tracking area (TA)) of the UE 100) of the UE 100 in the E-UTRAN 10. However, if a temporary resumption procedure described later is executed, in the ECM idle state, the UE context of the UE 100 may be present in the E-UTRAN 10.

In the ECM connected state, there is an NAS signaling connection between the UE 100 and the network. In the ECM connected state, there is the UE context of the UE 100 in the E-UTRAN 10. In the ECM connected state, the location of the UE 100 is known to the MME 300 by accuracy of the identifier of the SGW 400.

The UE 100 and the MME 300 switch the ECM state between the ECM idle state and the ECM connected state (ECM connected state).

The UE 100 and the MME 300 enter the ECM connected state from the ECM idle state when the signaling connection between the UE 100 and the MME 300 is established. The UE 100 enters the ECM connected state from the ECM idle state by the RRC connection being established. The MME 300 enters the ECM connected state from the ECM idle state by the S1 connection between the eNB 200 and the SGW 400 being established. The S1 connection is configured by the S1 MME connection and the S1 U connection.

The UE 100 and the MME 300 enter the ECM idle state from the ECM connected state when the signaling connection between the UE 100 and the MME 300 is released or when the signaling is broken. UE 100 enters the ECM idle state from the ECM connected state as a result of the RRC connection being released. The release of the signaling connection or the break (failure) thereof may be explicitly indicated to the UE 100 from the eNB 200. The UE 100 may detect the release of the signaling connection or the break (failure) thereof. The MME 300 enters the ECM idle state from the ECM connected state as a result of the S1 connection being released.

(Overview of Temporary Suspension Procedure)

Figure 6:
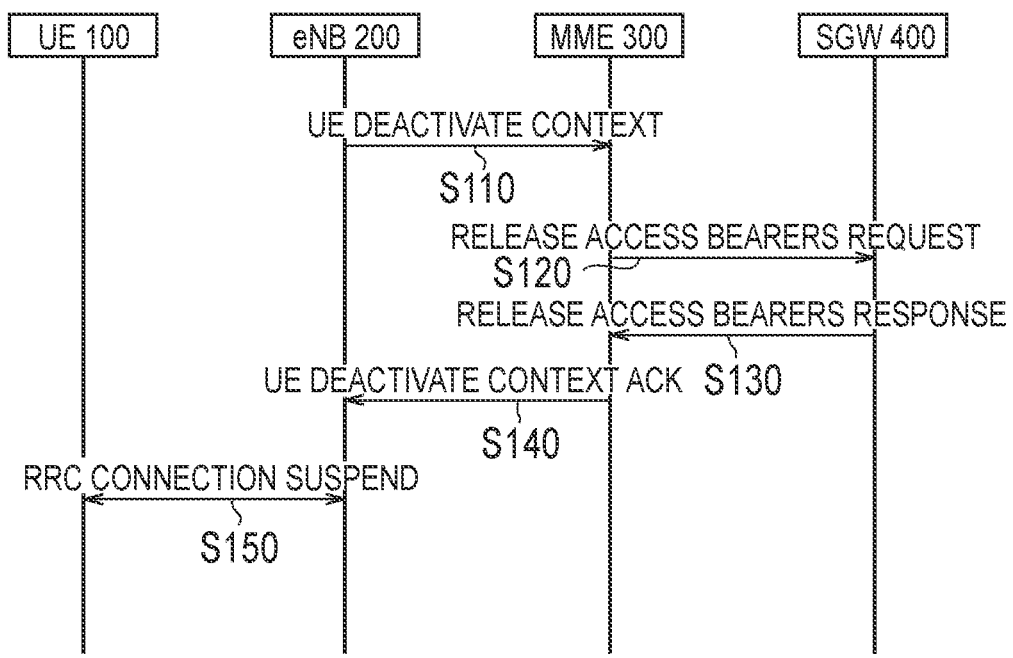
FIG. 6 is a sequence chart for describing an overview of a temporary suspension procedure.

An overview of the temporary suspension procedure (Suspend Connection procedure) will be described by using FIG. 6. FIG. 6 is a sequence chart for describing the overview of the temporary suspension procedure. The temporary suspension procedure is a procedure for temporarily suspending the connection between the UE 100 and the network.

In an initial state of FIG. 6, the UE 100 establishes the RRC connection with the eNB 200. Therefore, the UE 100 is in the RRC connected state. The UE 100 is in the ECM connected state.

As illustrated in FIG. 6, in step S110, the eNB 200 starts the temporary suspension procedure on the MME 300. Specifically, the eNB 200 transmits a UE deactivate context (UE Deactivate Context) message to the MME 300. The UE deactivate context message is a message indicating to the MME 300 that the RRC connection of the UE 100 is to be temporarily suspended upon the MME 300 entering the ECM idle state.

The eNB 200 and the MME 300 hold the context information of the UE 100. The context information includes at least any one of data regarding an S1 AP association, the UE context and a bearer context, information essential for resuming the connection, security information (for example, integrity algorithm), for example.

The MME 300 enters the ECM idle state, and thus, the context information is deactivated.

In step S120, the MME 300 transmits a release access bearer request (Release Access Bearers Request) message to the SGW 400. The release access bearer request message is a message for requesting a release of all S1 U bearers for the UE 100. The S1 U bearer corresponds to the S1 U connection. The MME 300 enters the ECM idle state from the ECM connected state.

The SGW 400 releases the S1 U bearer (S1 U connection). The SGW 400 releases all eNB related information on the UE 100. On the other hand, the SGW 300 may hold another information on the UE 100.

In step 130, the SGW 400 responds to the MME 300 by a release access bearer response (Release Access Bearers Response) message. The release access bearer response message is a message for informing the MME 300 about the release of the S1 U bearer.

In step S140, the MME 300 transmits a release access bearer acknowledgment (UE Deactivate Context ACK) message to the eNB 200.

In step S150, between the UE 100 and the eNB 200, the RRC connection is temporarily suspended. The eNB 200 transmits to the UE 100 a message indicating that the RRC connection is temporarily suspend. The UE 100 enters, in response to receipt of the message, the ECM idle state from the ECM connected state.

Step S150 is an RRC connection temporary suspension procedure. The RRC connection temporary suspension procedure is a part of the temporary suspension procedure.

(Overview of Resumption Procedure)

Figure 7:
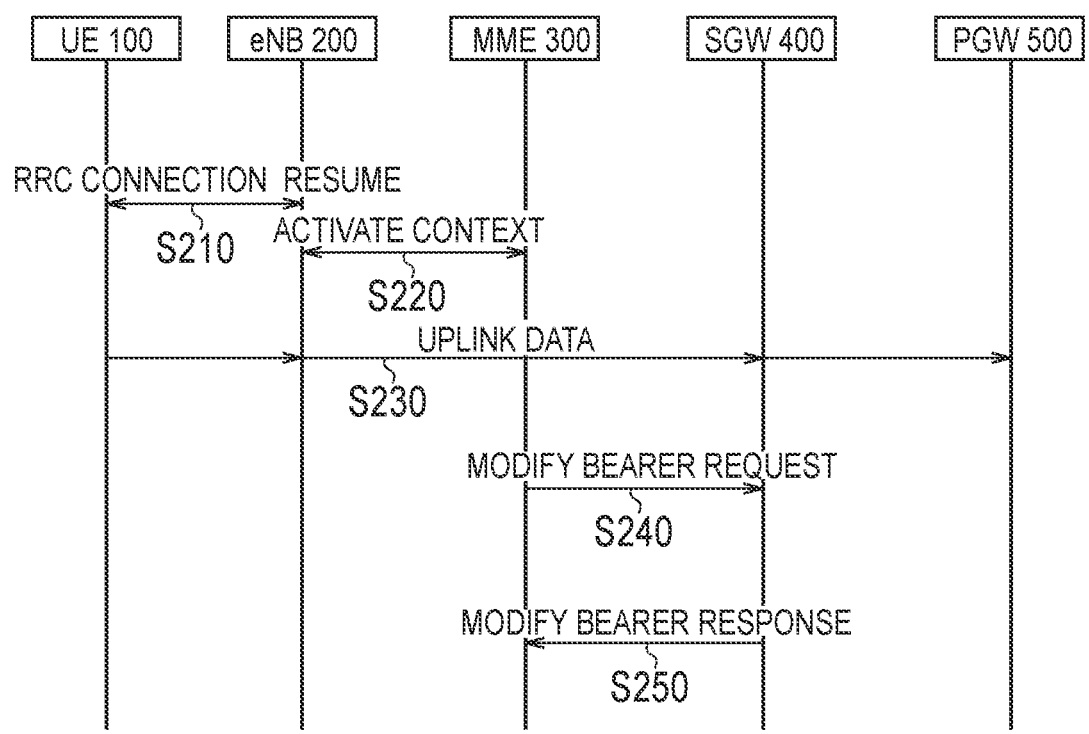
FIG. 7 is a sequence chart for describing an overview of a resumption procedure.

An overview of a resumption procedure (Resume Connection procedure) will be described by using FIG. 7. FIG. 7 is a sequence chart for describing the overview of of the resumption procedure. The resumption procedure is a procedure for resuming the connection between the UE 100 and the network.

In an initial state of FIG. 7, due to the temporary suspension procedure, the connection between the UE 100 and the network is temporarily suspended. Therefore, the RRC connection is suspended. The UE 100 is in the ECM idle state.

As illustrated in FIG. 7, in step S210, the UE 100 and the eNB 200 execute a procedure for resuming the RRC connection (RRC Connection Resume). The UE 100 triggers the RRC resumption procedure (RRC Connection Resume) to resume the RRC connection. For example, the UE 100 transmits an RRC connection resumption request to the eNB 200.

The RRC connection resumption procedure is a part of the resumption procedure.

In step S220, the eNB 200 and the MME 300 execute an activate context (Activate Context) procedure. In the activate context procedure, the eNB 200 notifies the MME 300 of the resumption of the RRC connection of the UE.

The MME 300 enters the ECM connected state. The MME 300 activates the context information of the UE 100.

In step S230, the UE 100 transmits uplink data to the eNB 200. The eNB 200 transmits the uplink data to the SGW 400. The SGW 400 transfers the uplink data to the PGW 500.

In step S240, the MME 300 transmits a modify bearer request (Modify Bearer Request) message for each PDN (Packet Data Network) connection, to the SGW 400.

In step S250, the SGW 400 transmits a modify bearer response (Modify Bearer Response) message to the MME 300.

(Operation According to First Embodiment)

Figure 8:
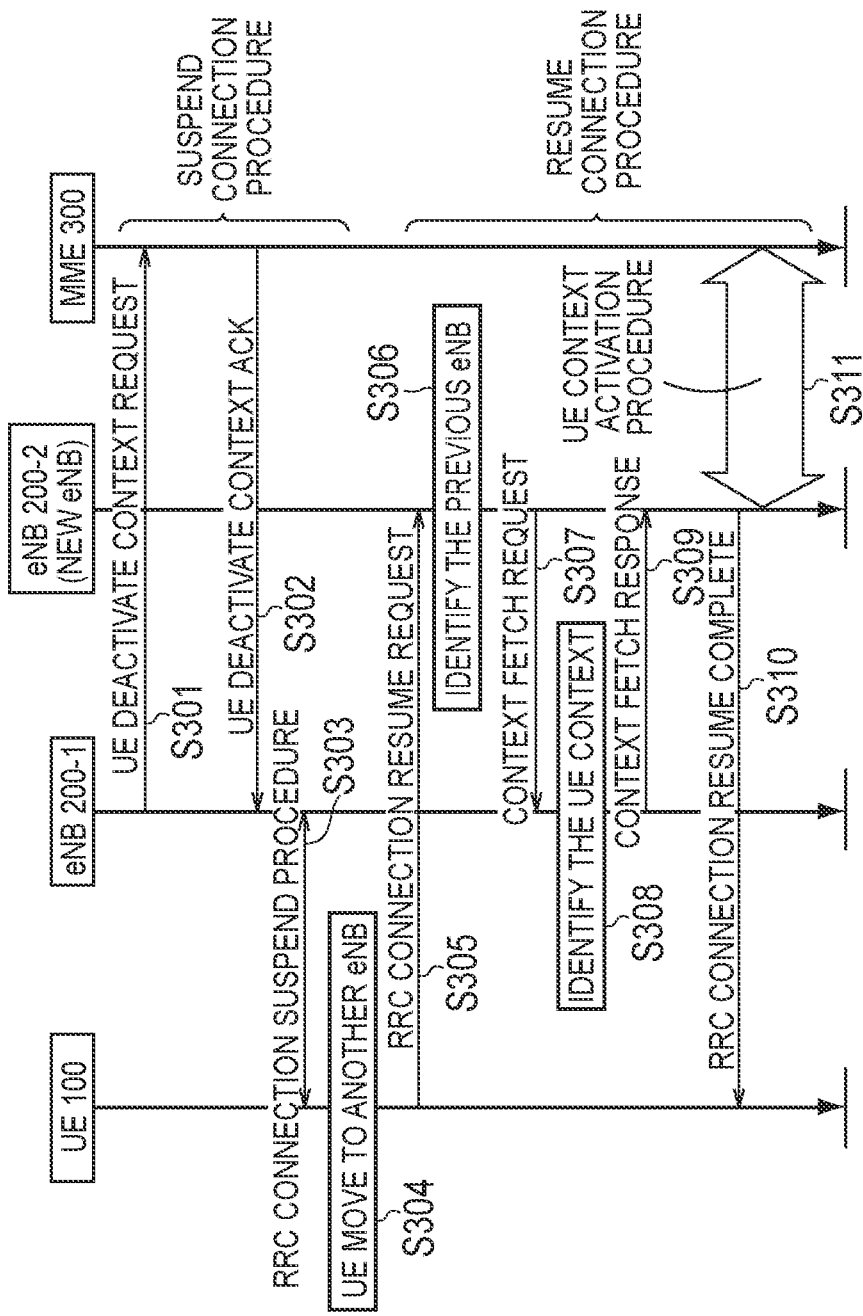
FIG. 8 is a sequence chart for describing an operation according to a first embodiment.

An operation according to a first embodiment will be described by using FIG. 8. FIG. 8 is a sequence chart for describing the operation according to the first embodiment.

In FIG. 8, steps S301 to S304 correspond to the temporary suspension procedure. Specifically, steps S301 to S303 correspond to steps S110, S120 and S150.

In step S303, an eNB 200-1 assigns a resumption identifier (Resume ID) to the UE 100.

The resumption identifier is an identifier assigned to the UE 100 in the temporary suspension procedure. The resumption identifier is associated with the context information of the UE 100 held in the eNB 200-1. The context information may include information such as an RRC context or an S1 AP context, for example.

A length of the resumption identifier may be variable. The eNB 200-1 may modify the length of the resumption identifier, depending on the number of UEs in its own cell. The eNB 200-1 may modify the length of the resumption identifier, depending on a specific setting. The specific setting is a "resumption identifier=variable-length identifier (Flexible length ID)+additional identifier (Additional ID)", for example. The variable-length identifier is an identifier capable of modifying a length. The variable-length identifier may be an identifier indicating predetermined information (for example, identification information, C-RNTI or the like). The additional identifier may have a length corresponding to the variable-length identifier. The additional length identifier may be a length allowing the length of the resumption identifier to be constant (length of resumption identifier=total length of variable-length identifier and additional identifier=constant value).

The resumption identifier may include information for identifying the length of the resumption identifier. For example, see below:

Resumption identifier=length identifier+variable-length identifier (a)

The length identifier indicates a length of the variable-length identifier (or the resumption identifier). A case where the length identifier is 3 bits is provided as an example. If the length identifier indicates "001", the variable-length identifier (resumption identifier) is 5 bits (8 bits). If the length identifier indicates "010", the variable-length identifier (resumption identifier) is 13 bits (16 bits). If the length identifier indicates "011", the variable-length identifier (resumption identifier) is 21 bits (24 bits). If the length identifier indicates "100", the variable-length identifier (resumption identifier) is 29 bits (32 bits).

Resumption identifier=header+variable-length identifier (b)

The header indicates the length of the variable-length identifier. For example, if the header indicates "1", the variable-length identifier is 1 byte. If the header indicates "2", the variable-length identifier is 2 bytes. If the header indicates "3", the variable-length identifier is 3 bytes.

Resumption identifier=first identifier+first length identifier+second identifier+second length identifier+ . . . +Mth identifier+Mth length identifier+ . . . +Nth identifier+Nth length identifier (C)

The Mth identifier is a fixed value (for example, 7 bits). The Mth length identifier indicates whether or not an identifier is followed. For example, if the Mth length identifier indicates "1", there is a subsequent identifier. In this case, subsequent to the Mth length identifier, there is at least an 8-bit identifier ((M+1)th identifier (7 bits)+(M+1)th length identifier (1 bit)). If the Mth length identifier indicates "0", there is no subsequent identifier. For example, if the second length identifier indicates 0, the resumption identifier is "first identifier (7 bits)+first length identifier (1 bit: 1)+second identifier (7 bits)+second length identifier (1 bit: 0)". Thus, the resumption identifier may be configured by a successive identifier set (Mth identifier+Mth length identifier).

The eNB 200 can grasp the length of the resumption identifier by the information for identifying the length of the resumption identifier. Accordingly, even if receiving a plurality of resumption identifiers different in length as a result of the modification of the length of the resumption identifier, the eNB 200 can exactly grasp each resumption identifier without confusion. The eNB 200 can exactly grasp the resumption identifier even if the resumption identifier is a resumption identifier assigned by another eNB 200.

At least a part of the resumption identifier may be identification information for identifying the eNB 200-1 with which the UE 100 has been connected when the temporary suspension procedure is executed. Therefore, the resumption identifier may include the identification information.

The identification information is a cell identifier for identifying a cell to which the UE 100 is to be connected when the temporary suspension procedure is executed, for example. The cell identifier is a PCI (Physical-layer Cell Identity) or an ECGI (E-UTRAN Cell Global ID), for example. The ECGI is configured by an identifier of a PLMN (Public Land Mobile Network) to which the cell belongs and a CI (Cell Indentity).

The identification information may include information of the eNB identifier for identifying the eNB 200-1 to which the UE 100 is to be connected when the temporary suspension procedure is executed. The eNB identifier is an eNB ID or a global eNB identifier, for example. The global eNB identifier is configured by a PLMN to which the eNB 200-1 belongs and the eNB ID.

At least a part of the resumption identifier may be a C-RNTI (Cell-Radio Network Temporary Identifier). The C-RNTI is a temporary identifier of the UE 100 within a cell to which the UE 100 is to be connected.

When the RRC connection temporary suspension procedure is executed, the RRC connection in the UE 100 is temporarily suspended. The UE 100 transitions to the ECM idle state.

In step S304, the UE 100 moves to a new eNB (eNB 200-2). Specifically, the UE 100 moves into a cell managed by the eNB 200-2. When executing the cell reselection, the UE 100 selects the cell.

In step S305, when resuming the RRC connection, the UE 100 transmits an RRC connection resumption request (RRC Connection Resume Request) message to the eNB 200-2. The RRC connection resumption request message is a message for requesting resumption of the RRC connection. The RRC connection resumption request message includes the resumption identifier. Therefore, the UE 100 transmits the resumption identifier to the eNB 200-2.

The UE 100 may include the aforementioned identification information (such as the PCI or the ECGI), into the RRC connection resumption request message. Accordingly, the UE 100 may transmit, together with the resumption identifier, the identification information, to the eNB 200-2. If at least a part of the resumption identifier is not the identification information, the UE 100 may transmit the identification information to the eNB 200-2.

The identification information may include the C-RNTI and/or a Short MAC-I. The C-RNTI is a C-RNTI assigned to the eNB 200-1. The Short MAC-I is 16 least significant bits of the MAC-I calculated by using a security setting of the source cell (cell of the eNB 200-1) and an identifier of a reestablishment cell (cell of the eNB 200-2).

The UE 100 may transmit the identification information to the eNB 200-2 if the cell reselection count after the temporary suspension procedure is executed is equal to or more than a threshold value. The UE 100 may omit the transmission of the identification information to the eNB 200 if the cell reselection count after the temporary suspension procedure is executed is less than a threshold value. The threshold value is a value of 1 or more. Thus, if it is highly likely that the resumption of the connection is requested to the eNB 200-1 having assigned the resumption identifier, the UE 100 can omit the transmission of the identification information. On the other hand, if it is highly likely that the resumption of the connection is requested to another eNB (eNB 200-2) different from the eNB 200-1 having assigned the resumption identifier, the UE 100 can transmit the identification information. With the identification information, the eNB 200-2 can identify the eNB 200-1 having assigned the resumption identifier, that is, the eNB 200-1 holding the context information of the UE 100.

Only when the cell (or the eNB) when the temporary suspension procedure is executed is different from a transmission target of the RRC connection resumption request message, the UE 100 may include the identification information into the RRC connection resumption request message. That is, if the temporary suspension procedure is not executed in the cell of the eNB 200-2, the UE 100 may transmit the identification information to the eNB 200-2. For example, the UE 100 stores the cell identifier (or the eNB Identifier) when the temporary suspension procedure is executed. Only when the stored cell identifier (or the eNB identifier) does not match the identifier of the cell selected by the cell reselection (or the eNB identifier configured to manage the selected cell), the UE 100 may include the identification information into the RRC connection resumption request message.

The UE 100 may transmit, together with the resumption identifier, the information necessary to (re)establish the RRC connection, to the eNB 200-2. The necessary information is information included in an RRC (re)connection request message. For example, the necessary information is the PCI, the C-RNTI, and the Short MAC-I. As a result, if the resumption of the RRC connection fails, even if the UE 100 does not transmit the RRC (re)connection request message, the RRC connection between the UE 100 and the eNB 200-2 can be established.

The eNB 200-2 receives the RRC connection resumption request message from the UE 100. The eNB 200-2 receives the resumption identifier (and the identification information).

The eNB 200-2 determines, based on the resumption identifier (and/or the identification information), whether or not to hold the context information of the UE 100. If the resumption identifier received from the UE 100 is not the resumption identifier assigned by the eNB 200-2, for example, the eNB 200-2 may determine that the context information of the UE 100 is not held. If the resumption identifier received from the UE 100 is the resumption identifier assigned by the eNB 200-2, the eNB 200-2 determines that the context information of the UE 100 is held. If receiving, together with the resumption identifier, the identification information from the UE 100, the eNB 200-2 may determine that the context information is not held. If not receiving the identification information from the UE 100, the eNB 200-2 may determine that the context information is held. The eNB 200-2 may determine, by a process of step S306, whether or not to hold the context information of the UE 100.

In step S306, based on the resumption identifier and/or the identification information, the eNB 200-2 identifies the eNB 200-1 having assigned the resumption identifier to the UE 100, that is, the eNB 200-1 holding the context information of the UE 100. The eNB 200-1 is the eNB configured to manage the cell with which the UE 100 has been connected, when assigning the resumption identifier to the UE 100.

If the resumption identifier and/or the identification information indicate the cell, the eNB 200-2 may indirectly identify the eNB 200-1, based on a list of a cell managed by the adjacent eNB.

If the resumption identifier and/or the identification information indicate the eNB 200-2, the eNB 200-2 determines that the eNB 200-2 holds the context information. The eNB 200-2 executes the resumption procedure. That is, the eNB 200-2 resumes the RRC connection, based on the context information of the UE 100.

On the other hand, if the resumption identifier and/or the identification information indicate another eNB (previous eNB), the eNB 200-2 executes a process of step S307.

In the present embodiment, the eNB 200-2 identifies the eNB 200-1, based on the resumption identifier and/or the identification information. The eNB 200-2 executes the process of step S307 on the identified eNB 200-1.

In step S307, the eNB 200-2 transmits a context fetch request (Context Fetch Request) message to the eNB 200-1. The eNB 200-1 receives the context fetch request message from the eNB 200-2.

The context fetch request message is a message (information) for receiving the context information of the UE 100. The context fetch request message may include the resumption identifier. The context fetch request message may include the identification information.

In step S308, the eNB 200-1 identifies the context information of the UE 100, based on the resumption identifier (and the identification information).

In step S309, the eNB 200-1 transmits a context fetch response (Context Fetch Response) message to the eNB 200-2. The eNB 200-2 receives the context fetch response message from the eNB 200-1.

The context fetch response message includes the context information of the UE 100. The context fetch response message may include the resumption identifier. The context fetch response message may include the identification information.

The eNB 200-2 resumes the RRC connection, based on the context information of the UE 100.

In step S310, the eNB 200-2 transmits an RRC connection resumption complete (RRC Connection Resume Complete) message to the UE 100. The UE 100 receives the RRC connection resumption complete message from eNB 200-2. The UE 100 enters the RRC connected state. The UE 100 enters the ECM connected state.

The RRC connection resumption complete message may include the resumption identifier.

In step S311, the eNB 200-2 and the MME 300 execute a UE context activate procedure. Step S311 corresponds to step S220. The MME 300 enters the ECM connected state.

The eNB 200-2 may transmit a message including the information indicating that the eNB 200 configured to manage the UE 100 is to be changed and the resumption identifier, to the MME 300. The message may be a path switch request message. The MME 300 can execute, based on the path switch request message, a control to switch the S1 U connection from the eNB 200-1 to the eNB 200-2.

First Modification According to First Embodiment

Figure 9:
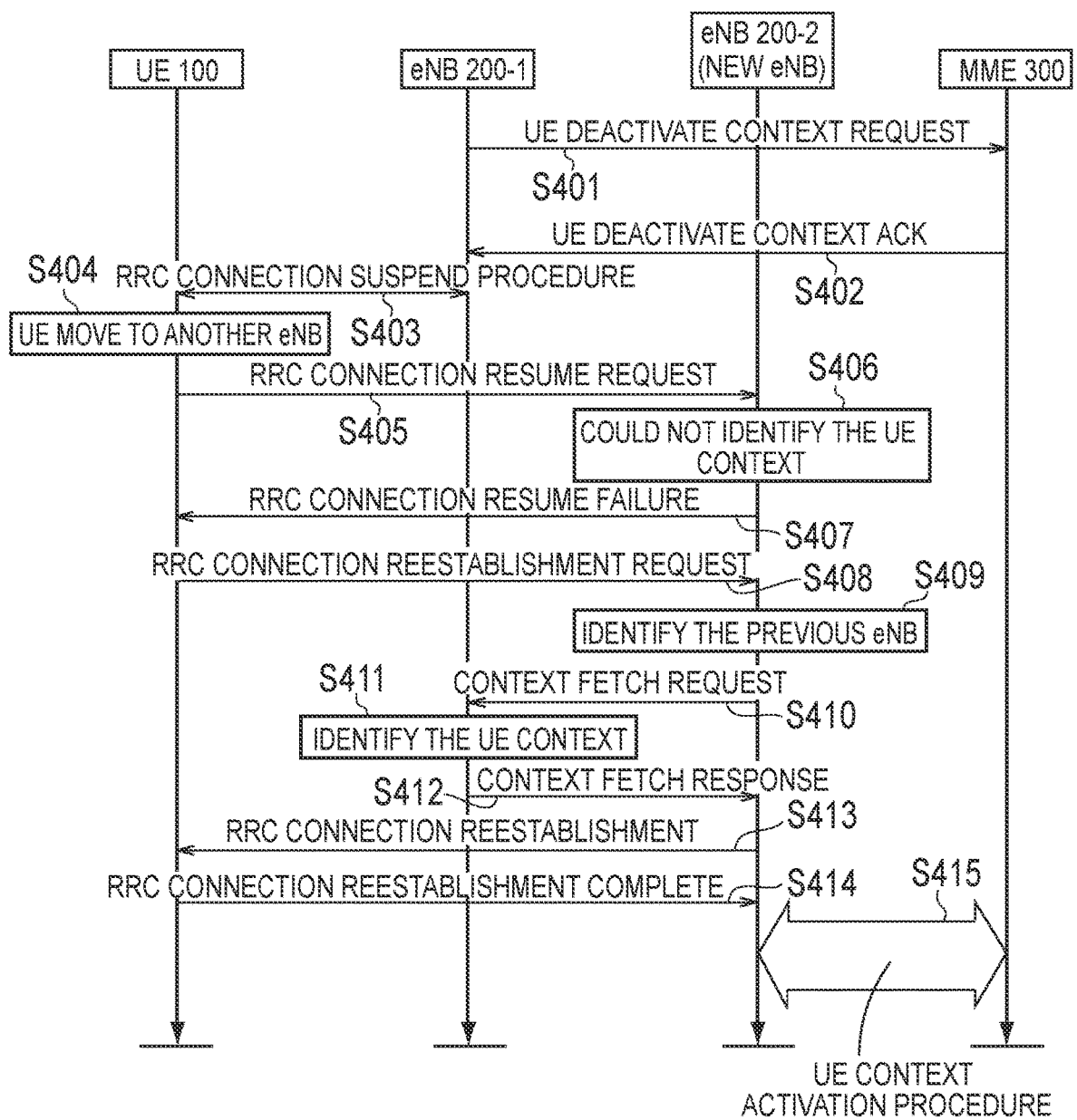
FIG. 9 is a sequence chart for describing a first modification according to the first embodiment.

A first modification according to the first embodiment will be described by using FIG. 9. FIG. 9 is a sequence chart for describing the first modification according to the first embodiment. The same description as above will be omitted.

In the present modification, if receiving from the eNB 200 information indicating that the eNB 200 does not hold the context information of the UE 100, the UE 100 transmits the identification information to the eNB 200.

As illustrated in FIG. 9, steps S401 to S404 correspond to steps S301 to S304.

In step S405, the UE 100 transmits the RRC connection resumption request message to the eNB 200-2. In the present modification, the RRC connection resumption request message includes the resumption identifier. On the other hand, the RRC connection resumption request message does not include the identification information.

In step S406, the eNB 200-2 determines, based on the resumption identifier, whether or not the context information of the UE 100 is held. If determining based on the resumption identifier that the context information of the UE 100 is not held, that is, it is not possible to identify the context information of the UE 100, the eNB 200-2 executes a process of step S407.

If holding the context information of the UE 100, the eNB 200-2 resumes the RRC connection. Then, the eNB 200-2 executes a process of steps S310 and S311.

The eNB 200-2 may determine whether or not to resume the RRC connection. If holding the context information of the UE 100, the eNB 200-2 determines to resume the RRC connection. If not holding the context information of the UE 100, the eNB 200-2 determines not to resume the RRC connection (resumption failed).

In step S407, the eNB 200-2 transmits an RRC connection resumption failure (RRC Connection Resume Failure) message to the UE 100. The UE 100 receives the RRC connection resumption failure message from the eNB 200-2.

The RRC connection resumption failure message may include information indicating that the eNB 200 does not hold the context information of the UE 100. The information may be reason information indicating why the context information of the UE 100 cannot be identified. The RRC connection resumption failure message may indicate that the eNB 200 does not hold the context information of the UE 100.

In step S408, the UE 100 transmits, in response to receipt of the information, an RRC connection reestablishment request (RRC Connection Reestablishment Request) message to the eNB 200-2. The eNB 200-2 receives the RRC connection reestablishment request message from the UE 100.

The UE 100 may transmit the RRC connection reestablishment request message to the eNB 200-2 even if a T 310 timer has not expired. If the T 310 timer expires, the UE 100 can start an RRC connection reestablishment procedure.

Even in the ECM idle state, the UE 100 may transmit the RRC connection reestablishment request message to the eNB 200-2.

The RRC connection reestablishment request message includes the identification information. For example, the RRC connection reestablishment request message includes the PCI, the C-RNTI, and the Short MAC-I.

Steps S409 to S412 correspond to steps S306 to S309.

In step S413, the eNB 200-2 transmits an RRC connection reestablish (RRC Connection Reestablishment) message to the UE 100. The UE 100 receives the RRC connection reestablishment message from the eNB 200-2. The RRC connection reestablishment message may include the resumption identifier.

In step S414, the UE 100 transmits an RRC connection reestablishment complete (RRC Connection Reestablishment Complete) message, to the eNB 200-2. The eNB 200-2 receives the RRC connection reestablishment complete message, from the UE 100. As a result, the RRC connection is established between the UE 100 and the eNB 200-2. The UE 100 transitions to the RRC connected state. The UE 100 transitions to the ECM connected state.

Step S415 corresponds to step S311.

Second modification According to the First Embodiment

Figure 10:
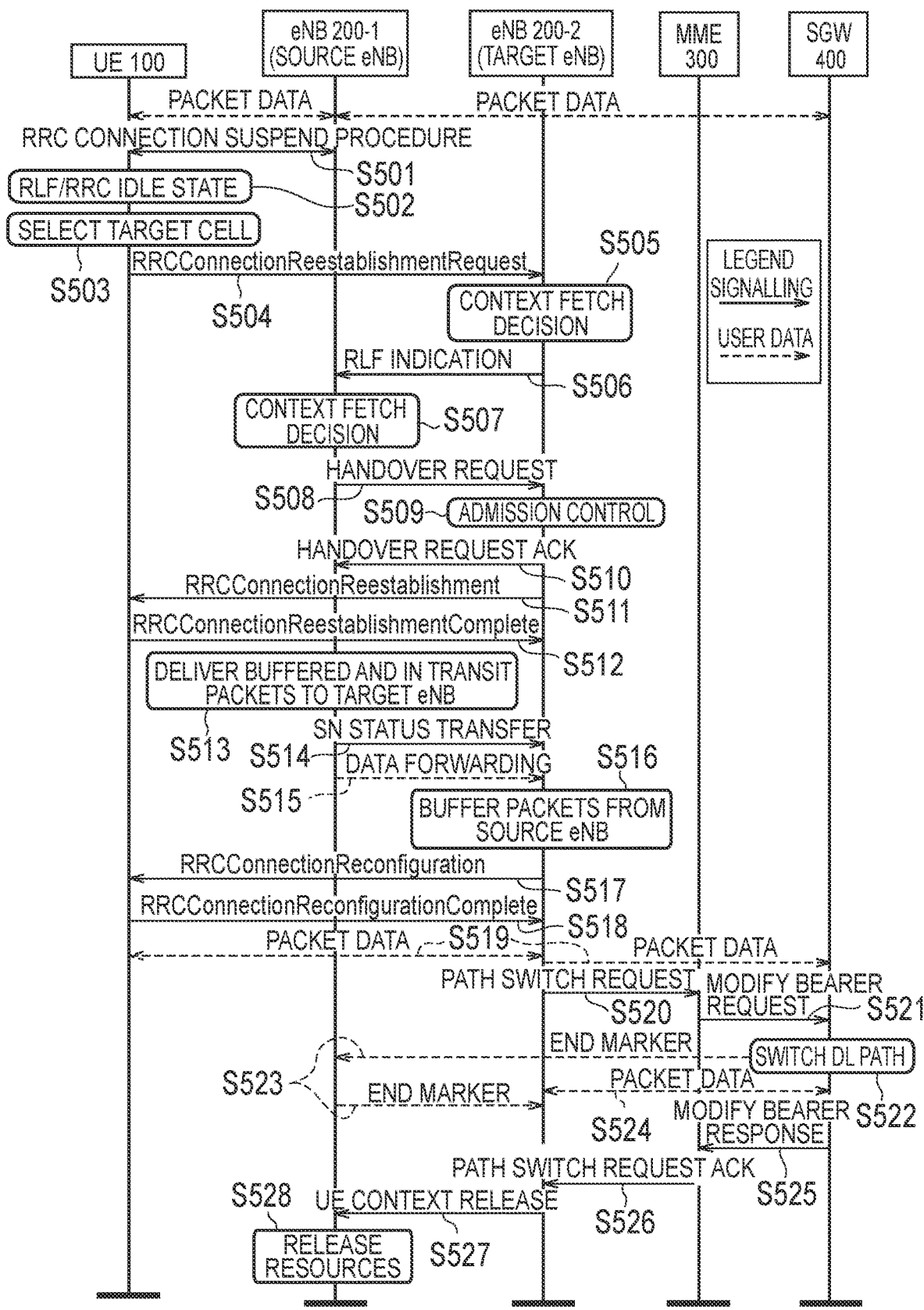
FIG. 10 is a sequence chart for describing a second modification according to the first embodiment.

A second modification according to the first embodiment will be described by using FIG. 10. FIG. 10 is a sequence chart for describing the second modification according to the first embodiment. The same description as above will be omitted.

In the present modification, the eNB 200-2 receives from the eNB 200-1 the context information of the UE 100 by a method different from that of the first embodiment.

In FIG. 10, in an initial state, the UE 100 exists in the cell (source cell) of the eNB 200-1 (Source eNB). The UE 100 receives packet data, via the eNB 200-1, from the SGW 400. The UE 100 transmits the packet data, via the eNB 200-1, to the SGW 400.

In step S501, the UE 100 executes an RRC temporary suspension procedure. The UE 100 includes a reestablishment identifier.

In step S502, the UE 100 detects a radio link failure (RLF). The UE 100 may (voluntarily) transition to the RRC idle state without detecting the RLF.

In step S503, the UE 100 executes the cell reselection. The UE 100 selects a target cell. The target cell is a cell managed by the eNB 200-2.

In step S504, the UE 100 transmits the RRC connection reestablishment message to the eNB 200-2. The RRC connection reestablishment message includes the reestablishment identifier. The RRC connection reestablishment message includes the PCI, the C-RNTI, and the Short MAC-I. Instead of the RRC connection reestablishment message, the UE 100 may use an RRC connection establishment (RRC Connection Establishment Request) message.

The UE 100 having transitioned to the RRC idle state in step S502 may transmit the RRC connection reestablishment message to the eNB 200-2 if desiring to start the data communication. Accordingly, the UE 100 may start a process of step S504, triggered by generation of the data.

In step S505, the eNB 200-2 decides whether or not to execute a context fetch. If the RRC connection reestablishment message includes the reestablishment identifier, the eNB 200-2 decides to execute the context fetch. In this case, the eNB 200-2 executes a process of step S506.

If holding the context information of the UE 100, the eNB 200-2 determines not to execute the context fetch. In this case, the eNB 200-2 starts, based on the context information, the establishment of the RRC connection with the UE 100.

In step S506, the eNB 200-2 transmits an RLF indication to the eNB 200-1. The RLF indication is an indication indicating generation of the RLF. To identify the context information of the UE 100, the RLF indication includes the PCI (or the ECGI), the C-RNTI, and the Short MAC-I. The RLF indication includes the ECGI for identifying the target cell. The RLF indication may include the resumption identifier. The RLF indication may include failure information indicating that the resumption of the connection has failed. For example, RRC Conn Reestab Indicator IE included in the RLF indication may include a value indicating a resumption failure (ENUMRATED: Resume Failure). Alternatively, the RLF indication may include a new IE (RRC Resume indicaor). The new IE may include information (Resume Failure) indicating a failure of the connection resumption.

If the RLF does not occur, that is, if the UE 100 voluntarily transitions to the RRC idle state, the eNB 200-2 may transmit a new X2 message to the eNB 200-1, instead of the RLF indication. The new X2 message can include the same information as the above RLF indication.

In step S507, the eNB 200-1 decides, in response to receipt of the RLF indication (resumption identifier), whether or not to execute the context fetch. The eNB 200-1 decides to execute the context fetch if holding the context information of the UE 100. In this case, the eNB 200-1 executes a process of step S508. On the other hand, if not holding the context information of the UE 100, the eNB 200-1 decides not to execute the context fetch. In this case, the eNB 200-1 may end the process.

In step S508, the eNB 200-1 transmits a handover request to the eNB 200-2. The handover request includes the context information of the UE 100. The handover request may include the resumption identifier. The context information of the UE 100 is included in a container (Source eNB to target eNB Container IE).

In step S509, the eNB 200-2 executes an admission control.

In step S510, the eNB 200-2 transmits a response to the handover request (Handover Request ACK) to the eNB 200-1.

Steps S511 and S512 correspond to steps S413 and S414.

In step S513, the eNB 200-1 decides to transfer the data of the UE 100 to the eNB 200-2.

In step S514, the eNB 200-1 transmits an SN state transfer (SN STATUS TRANSFER) message for conveying a sequence number (PDCP SN) of the data received from the UE 100 and a sequence number (PDCP SN) of the data transmitted to the UE 100, to the eNB 200-2.

In step S515, the eNB 200-1 transfers the data to the eNB 200-2.

In step S516, the eNB 200-2 stores the data (packet) transferred from the eNB 200-1.

In step S517, the eNB 200-2 transmits, to the UE 100, an RRC connection reconfiguration (RRC Connection Reconfiguration) message.

In step S518, the UE 100 transmits an RRC connection reconfiguration complete (RRC Connection Reconfiguration Complete) message to the eNB 200-2.

In step S519, the packet data is transmitted (and/or received) between the UE 100 and the eNB 200-2. The eNB 200-2 transmits the packet data to the SGW 400.

In step S520, the eNB 200-2 transmits a path switch request (PATH SWITCH REQUEST) message to indicate that the UE 100 has changed the cell, to the MME 300. The path switch request message includes the identifier of the UE 100 within the MME 300 (MME UE S1 AP ID) and the identifier of the UE 100 within the eNB 200-2 (eNB UE S1 AP ID). The path switch request message may be an MME UE S1 AP ID and an identifier of the UE 100 within the eNB 200-1 (eNB UE S1 AP ID). The identifier of the UE 100 within the eNB 200-1 may be included in the context information of the UE 100.

The MME 300 resumes the connection, based on these identifiers. Specifically, the MME 300 switches the S1 MME connection for the UE 100, based on these identifiers. That is, the MME 300 switches the connection target of the S1 MME connection from the eNB 200-1 to the eNB 200-2.

In step S521, the MME 300 transmits a modify bearer request (Modify Bearer Request) message to the SGW 400.

In step S522, the SGW 400 switches the downlink data path. That is, the SGW 400 switches the connection target of the S1 U connection (S1 U bearer) from the eNB 200-1 to the eNB 200-2 so that the downlink data path passes through the eNB 200-2.

In step S523, the SGW 400 transmits an end marker packet to the eNB 200-1. The eNB 200-1 transmits the end marker packet to the eNB 200-2.

In step S524, the SGW 400 and the eNB 200-2 transmit and/or receive the data packet of the UE 100.

In step S525, the SGW 400 transmits a modify bearer response (Modify Bearer Response) to the MME 300.

In step S526, the MME 300 transmits an acknowledgment to a path switch request (PATH SWITCH REQUEST ACK) to the eNB 200-2.

In step S527, the eNB 200-2 transmits a UE context release (UE Context Release) message to the eNB 200-1.

In step S528, the eNB 200-1 releases the context information of the UE 100.

Third Modification According to the First Embodiment

A third modification according to the first embodiment will be described by using FIG. 11. FIG. 11 is a flowchart for describing the third modification according to the first embodiment. The same description as above will be omitted.

In the present modification, the UE 100 determines, based on a condition, whether or not to request the resumption of the connection. An operation environment is similar to that in the first embodiment.

In an initial state, in the UE 100, the RRC connection is temporarily suspended due to the RRC temporary suspension procedure. The UE 100 is in the ECM idle state.

As illustrated in FIG. 11, if desiring the resumption of the RRC connection or the (re)establishment of the RRC connection, the UE 100 executes a process of step S610.

In step S610, the UE 100 determines whether or not to hold the resumption identifier. If holding the resumption identifier, the UE 100 executes a process of step S620. If not holding the resumption identifier, the UE 100 executes a process of step S640.

In step S620, the UE 100 determines whether or not a condition whether or not to execute the RRC resumption procedure is satisfied. If the condition is satisfied, the UE 100 executes a process of step S630. If the condition is not satisfied, the UE 100 executes a process of step S640.

The condition includes at least one of the following. If a plurality of conditions are satisfied, the UE 100 may execute the process of step S630.

A first condition is that the cell reselection count after the temporary suspension procedure is executed is less than a threshold value.

If the cell reselection count after the temporary suspension procedure is executed is less than a threshold value, the UE 100 executes the process of step S630. If the cell reselection count after the temporary suspension procedure is executed is equal to or more than a threshold value, the UE 100 executes the process of step S640. The threshold value is a value of 1 or more.

A second condition is that the UE 100 is located within a region capable of resuming the connection. If the UE 100 is located within the region capable of resuming the connection, the UE 100 executes the process of step S630. If the UE 100 is not located within the region capable of resuming the connection, the UE 100 executes the process of step S640.

The UE 100 may determine, based on the resumption identifier, whether or not the UE 100 is located within the region capable of resuming the connection (resumption region). For example, at least a part of the resumption identifier may be area information indicating the resumption region. The area information indicates, for example, a tracking area. For example, a header of the resumption identifier may be the area information.

If the tracking area where the UE 100 is located and the area information match, the UE 100 determines that the UE 100 is located within the resumption region.

A third condition is that the eNB 200 configured to establish the RRC connection is included in an eNB group (eNB cluster) to support a transfer of the context information of the UE 100. If the eNB 200 configured to manage the selected cell is included in the eNB group, as a result of the cell reselection being executed, the UE 100 executes the process of step S630. If the eNB 200 is not included in the eNB group, the UE 100 executes the process of step S640.

The UE 100 may determine whether or not the eNB 200 is included in the eNB group, based on the cluster information, for example.

The cluster information is information for identifying the eNB group to support the transfer of the context information of the UE 100. The context information of the UE 100 can be transferred between the eNBs (for example, adjacent eNBs) belonging to the same eNB group. The X2 interface may be established between the eNBs included in the same eNB group. The cluster information may include information for identifying a cell such as the PLMN and the PCI, for example. As a result of receiving system information block (for example, SIB1: System Information Block 1) including the information for identifying the cell, the UE 100 can determine whether or not the eNB 200 (cell) is included in the eNB group. The cluster information may include another information (for example, identification information described above).

The UE 100 may receive the cluster information from the MME 300 by the NAS message when the context information of the UE 100 is generated by an attach procedure or the like, for example. The UE 100 may receive the cluster information when the temporary suspension procedure is executed.

In step S630, the UE 100 executes the RRC resumption procedure. That is, the UE 100 transmits the resumption identifier to the eNB 200.

In step S640, the UE 100 executes an RRC (re)connection procedure. That is, the UE 100 does not transmit the resumption identifier to the eNB 200.

Thus, for example, if the cell reselection count after the temporary suspension procedure is executed is less than a threshold value, the UE 100 transmits the resumption identifier to the eNB 200. If the cell reselection count is equal to or more than a threshold value, the UE 100 omits the transmission of the resumption identifier. As a result, if it is highly likely to request the resumption of the connection to the eNB 200 having assigned the resumption identifier (the eNB 200 holding the context information), the UE 100 can transmit the resumption identifier. If it is highly likely to request the resumption of the connection to another eNB 200 not having assigned the resumption identifier (the eNB 200 not holding the context information), the UE 100 performs the existing RRC (re)connection request. Therefore, it is possible to prevent a situation where the RRC resumption procedure fails, and thus, it is possible to reduce the signaling.

If the UE 100 is located within the region capable of resuming the connection, the UE 100 transmits the resumption identifier to the eNB 200. If the UE 100 is not located within the region capable of resuming the connection, the UE 100 omits the transmission of the resumption identifier. As a result, the UE 100 can omit the transmission of the resumption identifier to the eNB 200 not capable of resuming the connection. Therefore, it is possible to prevent a situation where the RRC resumption procedure fails, and thus, it is possible to reduce the signaling.

If the eNB 200 of the connection target is included in the eNB group, the UE 100 transmits the resumption identifier. If the eNB 200 of the connection target is not included in the eNB group, the UE 100 omits the transmission of the resumption identifier. As a result, the UE 100 can omit the transmission of the resumption identifier to the eNB 200 not capable of resuming the connection. Therefore, it is possible to prevent a situation where the RRC resumption procedure fails, and thus, it is possible to reduce the signaling.

Second Embodiment

A second embodiment will be described by using FIG. 12. FIG. 12 is a sequence chart for describing the second embodiment.

A case is assumed where to reduce the signaling, while the S1 U bearer is not established, the uplink data is transmitted by the NAS message from the UE 100 to the MME 300. When the U-plane data is piggybacked to the NAS signaling, the uplink data (and the downlink data) can be carried between the UE 100 and the MME 300. Thus, for example, it is possible to reduce a signaling about an initial context setup procedure for E-RAB configuration and a signaling about an RRC security mode command.

In an initial state, the uplink data is transmitted by an initial UE message (Initial UE Message) from the eNB 200 to the MME 300. If there is the downlink data for the initial UE message, a downlink S1AP message (Downlink S1-AP msg.) including the downlink data is transmitted from the MME 300 to the eNB 200. The downlink S1AP message includes the identifier of the UE 100 within the MME 300 (MME UE S1AP ID).

Then, if the uplink data is transmitted, the uplink data is transmitted by an NAS UL transport message from the eNB 200 to the MME 300.

Here, the NAS UL transport message needs to include the identifier of the UE 100 within the MME 300 (MME UE S1AP ID). If there is the downlink data for the initial UE message, the eNB 200 can include the MME UE S1AP ID notified from the MME 300, into the NAS UL transport message.

If there is no downlink data for the initial UE message, the downlink S1AP message is not transmitted from the MME 300 to the eNB 200. Accordingly, the eNB 200 may not be able to include the identifier of the UE 100 within the MME, into the NAS UL transport message. It is essential that the NAS UL transport message includes the identifier of the UE 100 within the MME 300, and thus, the eNB 200 may not be able to transmit the uplink data to the MME 300 by the NAS UL transport message.

In the initial state of FIG. 12, the UE 100 is in the RRC idle state. The UE 100 is in the ECM idle state.

As illustrated in FIG. 12, in step S701, to transmit the uplink data from the UE 100 to the eNB 200, the UE 100 and the eNB 200-2 establish the RRC connection. The UE 100 transmits the NAS message including the uplink data, to the eNB 200.

The NAS message may include release assistance information (Release Assistance Informatin).

The release assistance information is information indicating whether or not the downlink data (the ACK or the response) is expected for the uplink data, for example. The release assistance information may be information indicating whether or not the Si connection is released after transmission of the downlink data.

In step S702, the eNB 200 transmits the initial UE message to the MME 300. The initial UE message includes the uplink data included in the NAS message.

Steps S703 to S705 correspond to steps S301 to S303. In step S705, in the temporary suspension procedure, the eNB 200 assigns to the UE 100 the resumption identifier associated with the context information of the UE 100.

In step S706, if there is the uplink data, the UE 100 decides whether or not to execute the process of step S707. That is, by utilizing the resumption procedure, the UE 100 decides whether or not to transmit the uplink data by the NAS message.

If not receiving an NAS PDU (NAS Protocol Data Unit) including the downlink data from the eNB 200, the UE 100 may execute the process of step S707. The NAS PDU is transmitted from the eNB 200 to the UE 100 if the downlink S1AP message is transmitted from the MME 300 to the eNB 200. Therefore, if the eNB 200 transmits the NAS PDU including the downlink data to the UE 100, the eNB 200 already knows the MME UE S1AP ID.

If a transmission count of the uplink data by the NAS message is two or more and the UE 100 holds the resumption identifier, the UE 100 may execute the process of step S707.

If not holding the resumption identifier, the UE 100 may trigger the RRC temporary suspension procedure. That is, in order that the resumption identifier is assigned from the eNB 200, the UE 100 may request to the eNB 200-2 the execution of the RRC temporary suspension procedure.

In step S707, the UE 100 transmits a resumption request to the eNB 200. If not receiving the NAS PDU (NAS Protocol Data Unit) including the downlink data from the eNB 200, the UE 100 transmits the resumption request to the eNB 200. The resumption request includes the NAS message (NAS PDU) including the uplink data and the resumption identifier. Therefore, the UE 100 transmits, together with the NAS message, the resumption identifier to the eNB 200.

The resumption request may include the release assistance information.

In step S708, the eNB 200 transmits a resumption response to the UE 100.

In step S709, the eNB 200 identifies the MME UE S1AP ID, based on the resumption identifier. Specifically, the eNB 200 identifies the context information of the UE 100 associated with the resumption identifier. The eNB 200 obtains the MME UE S1AP ID included in the context information.

In step S710, the eNB 200 executes a control to transmit the NAS UL transport message including the MME UE S1AP ID and the uplink data to the MME 300. The NAS UL transport message may include eNB UE S1AP ID or identifier of the UE 100 within the eNB 200.

In step S711, the eNB200 and the MME 300 may execute the UE context activate procedure described above. Alternatively, the eNB200 and the MME 300 may omit the UE context activate procedure. As a result, it is possible to further reduce the signaling.

In step S712, the UE 100 and the eNB 200 may execute the RRC connection temporary suspension procedure described above. Alternatively, the UE 100 and the eNB 200 may omit the RRC connection temporary suspension procedure. As a result, it is possible to further reduce the signaling.

Thus, the UE 100 transmits, together with the NAS message including the uplink data, the resumption identifier to the eNB 200. The eNB 200 receives, together with the NAS message including the uplink data, the resumption identifier from the UE 100. As as a result, the eNB 200 identifies the MME UE S1AP ID, based on the resumption identifier. Accordingly, even if not receiving the downlink S1AP message from the MME 300, the eNB 200 can obtain the MME UE S1AP ID, and thus, the eNB 200 can transmit the NAS UL transport message including the uplink data.

Other Embodiments

The contents of the present application are described according to each of the embodiments, but it should not be understood that the discussion and the drawings constituting a part of this disclosure limit the contents of the present application. From this disclosure, various alternative embodiments, examples, and operational technologies will become apparent to those skilled in the art.

In the first embodiment, the message including the resumption identifier from the UE 100 to the eNB 200-2 (the RRC connection resumption request message, the RRC connection reestablishment request message, and the RRC connection establishment request message) may be another message (for example, a new message). The UE 100 may include the resumption ID identifier into the message that can be transmitted in the RRC state.

In the first embodiment, the RRC connection resumption request message may be replaced by an RRC (re)connection establishment request message. The RRC (re)connection establishment request message may be replaced by the RRC connection resumption request message.

Steps S307 to S309 in the first embodiment may be replaced by steps S506 to S510. Specifically, the context fetch request message in step S307 may be the RLF indication (Radio Link Failure Indication) in step S506. The context fetch response message in step S309 may be the handover request message in step S508. In this case, the eNB 200-2 may transmit a response to the handover request (Handover Request ACK) to the eNB 200-1. The eNB 200-1 may transmit, in response to receipt of the RLF indication from the eNB 200-2, the context information of the UE 100 to the adjacent eNB 200 different from the eNB 200-2. The eNB 200-1 may transmit the context information of the UE 100 to the adjacent eNB 200 by the handover request message. Accordingly, the eNB 200-1 may transmit the context information of the UE 100 to the adjacent eNB different from the transmission source of the RLF indication.

Similarly to above, steps S506 to S510 may be replaced by step S307 to S309.

In the first embodiment, the resumption identifier is assigned from one eNB 200; however, this is not limiting. The UE 100 may be assigned with the resumption identifier from each of a plurality of eNBs 200. For example, even after executing the resumption procedure, the UE 100 does not delete the resumption identifier and stores the resumption identifier. The UE 100 executes the temporary suspension procedure in a new cell (new eNB 200) to thereby obtain a new resumption identifier. As a result, the UE 100 stores a plurality of resumption identifiers. The UE 100 associates the resumption identifier and the eNB 200 having assigned the resumption identifier. If transmitting the RRC connection resumption request, the UE 100 includes the resumption identifier assigned from the eNB 200 configured to manage the selected cell.

In this case, the MME 300 manages a plurality of context information for a single UE 100. For example, the MME 300 may associate information of the UE 100 included in an initial attach (for example, GUTI: Global Unique Temporary Identity) and the context information common in each eNB 200. Accordingly, the MME 300 can reduce an amount of the context information to be stored, and thus, it is possible to reduce a load of the MME 300. The common context information is a context other than the S1 UE context regarding the Si connection between the eNB 200 and the MME 300 (S1-MME connection).

In the first embodiment, the eNB 200 and/or the MME 300 may create the context information of the UE 100 again, if failing to resume the connection. The eNB 200 may notify the UE 100 and/or the MME 300 of the (re)creation of the context information. The UE 100 and/or the MME 300 may transmit information necessary to (re)create the context information, to the eNB 200-2. Similarly, the MME 300 may notify the UE 100 and/or the eNB 200-2 of the (re)creation of the context information. The UE 100 and/or the eNB 200-2 may transmit the information necessary to (re)create the context information, to the MME 300.

If failing to resume a part of the connection (for example, the RRC connection and/or the Si connection), the eNB 200 and/or the MME 300 may utilize a remaining successfully resumed connection. That is, the eNB 200 and/or the MME 300 may (re)establish only a part of the connection failed in resumption. As a result, it is possible to reduce the signaling.

In the second embodiment, the UE 100 may transmit the NAS message including the uplink data and the resumption identifier by another message different from the resumption request. For example, the UE 100 may transmit the NAS message and the resumption identifier by a message (RRC setup request message) in an RRC setup procedure.

If receiving the NAS PDU (NAS Protocol Data Unit) including the downlink data from the eNB 200 at least once, the UE 100 may omit the transmission of the resumption identifier. That is, the UE 100 may transmit the message including the NAS message including the uplink data, while not including the resumption identifier, to the eNB 200.

The operation according to each of the embodiments may be combined to be executed, where necessary. In each of the above-described sequences, all of the operations may not be necessarily essential. For example, in each sequence, only some of the operations may be executed.

Although not particularly mentioned in each of the embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program on a computer. Here, the computer-readable medium recording therein with the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor) for executing the program stored in the memory.

In the embodiments, an LTE system is described as an example of the mobile communication system; however, the LTE system is not an exclusive example, and the content according to the present application may be applied to a system other than the LTE system.

[Supplement Note]
1. Introduction

For achieving a function that resuming a connection with an eNB different than where the connection was suspended, although transferring of UE context is needed from an eNB which served UE previously to other eNB which receives the resume request and does not have valid UE context, similar function (i.e. UE context transfer) for the legacy UE is available. The existing UE context transfer is assumed to be initiated by RRC Connection Reestablishment Request message. This message is assumed to be sent on RRC_CONNECTED state, strictly speaking, Second Phase of RRC_CONNECTED. It indicates that existing UE context transfer is only available during RRC_CONNECTED.

On the other hands, for the NB-IoT UE supporting UP-based solution, there is a possibility that the RRC_IDLE UE try to resume a connection with an eNB different than where the connection was suspended. This case is not supported by existing UE context transfer function, because the legacy eNB would discard the UE context when the UE transition to RRC_IDLE. However for the UP-based solution, the eNB supporting this solution can retain the UE context even though the UE transition to RRC_IDLE, which means that if an eNB supporting this solution has not UE context and the eNB receives the RRC message to resume UE context from an UE, the eNB still has a chance to fetch UE context from other eNB if the other eNB retains UE context for the UE. So in order to respect the original motivation of UP-based solution i.e., decreasing signalling overhead, RAN3 need to consider both RRC_CONNECTED and RRC_IDLE cases.

Observation 1; For UP-based solution, since the eNB supporting this solution can retain the UE context when the UE transition to RRC_IDLE, UE context transfer could be used for RRC_IDLE UE (NB-IoT UE).

Note: If RAN2 prohibit the NB-IoT UE from resuming towards the eNB which does not have UE context for such UE, consideration of RRC_IDLE case is not needed.

(Existing UE Context Transfer)

It has already discussed the function of UE context transfer and added the stage-2 change to achieve this function. This existing function can be workable where UE state is RRC_CONNECTED. This existing function is consist of at least following 3 steps:

RLF Indication (step 1)

After receiving the RRC Connection Reestablishment Request message, the eNB 1 (which does not have the UE context) identifies the previous eNB (eNB 2) which the UE was served before, then sends the RLF Indication message to the eNB2 to inform that UE context is needed.

So the eNB1 needs to identify the previous eNB and indicate which UE's context is needed. For these requirements, the eNB1 can use the information included in RRC Connection Reestablishment Request message (i.e. PCI and C-RNTI).

Handover Procedure (step 2)

After receiving the RLF Indication message from the eNB 1, the eNB 2 needs to identify which UE's context is requested and is to be transferred to the eNB 1. The eNB 2 can use the Handover Request message to transfer it. For this requirement, the eNB 2 can uses C-RNTI and PCI to identify the UE context and uses the ECGI to identify the address of Handover Request message, which are included in RLF Indication message.

Path Switch Request (step 3)

After receiving the UE context from the eNB 2, eNB 1 needs to update the DL path by using the Source MME UE S1AP ID IE.

(Case 1_UE context transfer for the NB-IoT UE on RRC_CONNECTED)

For the NB-IoT UE case, in order to decrease the standardization effort, it should consider the UE context transfer for such an UE is based on existing function. In addition, it decided that "At RLF, for solution 2, reestablishment is not supported so the UE would released to Idle. For solution 18 it would be possible to do reestablishment (it is FFS if at reestablishment failure the UE would be released to Idle, as for legacy LTE)." It indicates that during RRC_CONNECTED state, if the NB-IoT UE supporting UP-based solution faces the RLF, the UE could send the RRC Connection Reestablishment Request message to maintain the RRC connection. So from the eNB point of view, the eNB could assume that this message would be the trigger of UE context transfer function for the NB-IoT UE after e.g., RLF as well as existing UE context transfer function if there is no valid UE context. Since necessary information for achieving the UE context transfer (i.e. PCI, C-RNTI) for the UE are same as legacy procedure, additional information may not be needed.

For the Path Switch Request, from the MME point of view, MME just need the Source MME UE S1AP ID IE to switch the old path to new one. So the eNB may not need to care which eNB UE S1AP ID (i.e. suspended eNB UE S1AP ID by the eNB 2 or newly allocated eNB UE S1AP ID by the eNB 1) should be included in the Pats Switch Request.

Observation 2: For the RRC_CONNECTED UE supporting UP-based solution, the eNB could assume that RRC Connection Reestablishment Request message would be the trigger of UE context transfer function for NB-IoT UE supporting UP-based solution. In this case, the eNB could use existing UE context transfer function (existing X2 messages) for the UE without any impact.

(Case 2_UE context transfer for the NB-IoT UE supporting UP-based solution which UE's context is already suspended (i.e. UE is RRC_IDLE state))

In this case, it should consider the RRC_IDLE UE mobility according to the following requirement.

"The resumption of the previously suspended connection is limited to the cells configured on the eNB where that connection was previously suspended. However, this solution can also be introduced and supported for UEs having transactions over multiple eNBs by introducing it over a cluster of eNBs that support UE Context transfer between the eNBs via the X2 interface, see TS 36.300 using handover preparation procedure see clause 20.2.2.1."

At this moment, a message of RRC resume procedure has not been decided yet, which means that a trigger of UE context transfer also has not been decided for RRC_IDLE UE supporting UP-based solution. So, it could not know whether there is sufficient information like PCI and C-RNTI for UE context transfer or not in the trigger message. Anyway it needs to consider case 2 after the RAN2 decision (i.e. which RRC message would be used for RRC resume procedure). Even if RAN2 decides to use different message from RRC Connection Reestablishment Request message as RRC resume request, this message includes the sufficient information for UE context transfer, it needs to consider this message could be used as trigger of UE context transfer. In this case, specification impact may be expected due to the different RRC message and the different information compared with existing one. For instance, the trigger of RLF Indication message (i.e. RRC re-establishment attempts or receiving RLF report) may need to be changed and it causes specification impact.

Proposal 1: For the RRC_IDLE UE supporting UP-based solution, RAN3 should consider the impact of UE context fetch, if RRC resume request message from RRC_IDLE UE is differ from existing RRC Connection Reestablishment Request message.

The invention claimed is:

1. A communication method, comprising:
   receiving, by a user equipment from a base station included in a Radio Access Network (RAN), a first RRC message for suspending an RRC connection between the user equipment and the RAN, the first RRC message including a resumption identifier;
   entering, by the user equipment, an RRC idle state in response to reception of the first RRC message;
   when the user equipment is in the RRC idle state, transmitting, by the user equipment to the base station, uplink user data together with an RRC Resume Request message including the resumption identifier without entering an RRC connected state, the uplink user data being user data to be transmitted from the user equipment to a core network via the base station,
   transmitting, by the base station, the uplink user data received from the user equipment to the core network; and
   when the user equipment is in the RRC idle state, receiving, by the user equipment from the base station, a second RRC message for keeping the user equipment in the RRC idle state, after the uplink user data is transmitted by the base station to the core network.

2. The communication method according to claim 1, wherein
   the first RRC message includes area information indicating a predetermined area comprising a plurality of cells, the area information including a plurality of cell identifiers of the plurality of cells; and the communication method further comprises:
   selecting a cell of a second base station as a serving cell of the user equipment;
   determining, by the user equipment, whether or not the serving cell belongs to the predetermined area; and
   performing a predetermined RRC procedure, by the user equipment, in response to determining that the serving cell does not belong to the predetermined area.

3. A user equipment comprising:
   a processor and a memory, the processor is configured to
   receive, from a base station included in a Radio Access Network (RAN), a first RRC message for suspending an RRC connection between the user equipment and the RAN, the first RRC message including a resumption identifier;
   enter an RRC idle state in response to reception of the first RRC message;

when the user equipment is in the RRC idle state, transmit to the base station, uplink user data together with an RRC Resume Request message including the resumption identifier without entering an RRC connected state, the uplink user data being user data to be transmitted from the user equipment to a core network via the base station; and when the user equipment is in the RRC idle state, receive, from the base station after the uplink user data is received by the base station from the user equipment and transmitted to the core network by the base station, a second RRC message for keeping the user equipment in the RRC idle state.

4. The user equipment according to claim 3, wherein the first RRC message includes area information indicating a predetermined area comprising a plurality of cells, the area information including a plurality of cell identifiers of the plurality of cells, and the user equipment further:

selects a cell of a second base station as a serving cell of the user equipment;

determines whether or not the serving cell belongs to the predetermined area; and performs a predetermined RRC procedure in response to determining that the serving cell does not belong to the predetermined area.

5. An apparatus to be provided in a user equipment, the apparatus comprising:

a processor and a memory, the processor being configured to receive, from a base station included in a Radio Access Network (RAN), a first RRC message for suspending an RRC connection between the user equipment and the RAN, the first RRC message including a resumption identifier;

enter an RRC idle state in response to reception of the first RRC message;

when the user equipment is in the RRC idle state, transmit to the base station, uplink user data together with an RRC Resume Request message including the resumption identifier without entering an RRC connected state, the uplink user data being user data to be transmitted from the user equipment to a core network via the base station; and when the user equipment is in the RRC idle state, receive, from the base station after the uplink user data is received by the base station from the user equipment and transmitted to the core network by the base station, a second RRC message for keeping the user equipment in the RRC idle state.

6. The apparatus according to claim 5, wherein the first RRC message includes area information indicating a predetermined area comprising a plurality of cells, the area information including a plurality of cell identifiers of the plurality of cells, and the apparatus further:

selects a cell of a second base station as a serving cell of the user equipment;

determines whether or not the serving cell belongs to the predetermined area; and performs a predetermined RRC procedure in response to determining that the serving cell does not belong to the predetermined area.

* * * * *